US005552795A

United States Patent [19]

Tayloe et al.

[11] Patent Number: 5,552,795
[45] Date of Patent: Sep. 3, 1996

[54] LOCATION DETERMINATION METHOD AND SYSTEM USING MULTI-BEAM SATELLITES

[75] Inventors: Daniel R. Tayloe, Phoenix; Kenneth L. Sowles, Chandler, both of Ariz.

[73] Assignee: Motorola, Inc., Schaumburg, Ill.

[21] Appl. No.: 237,705

[22] Filed: May 3, 1994

[51] Int. Cl.$^6$ .............................. C01S 5/02; H04M 11/00; H04B 7/185
[52] U.S. Cl. .......................... 342/357; 379/59; 455/12.1; 455/54.2
[58] Field of Search .......................... 342/357; 455/12.1, 455/54.2; 379/59

[56] References Cited

U.S. PATENT DOCUMENTS 5,365,451  11/1994  Wang et al. ............................ 364/449

Primary Examiner—Gregory C. Issing
Attorney, Agent, or Firm—Kevin K. Johanson; Walter W. Nielsen

[57] ABSTRACT

In a method and system for performing location determination using multi-beam satellites each beam of a multi-beam satellite transmits identification information which is received by a user terminal. This identification information either identifies the unique beam by enumeration or by geometrics. A user terminal processes multiple received signals from orbiting satellites. The user terminal maps the projected beam patterns of multiple received samples to determine an approximate self-location. The user terminal passively monitors its location and compares its current location with its previously reported location. When the user terminal has sufficiently roamed from its previously registered location, the user terminal performs an auto-registration to the system allowing for efficient routing of information.

19 Claims, 6 Drawing Sheets

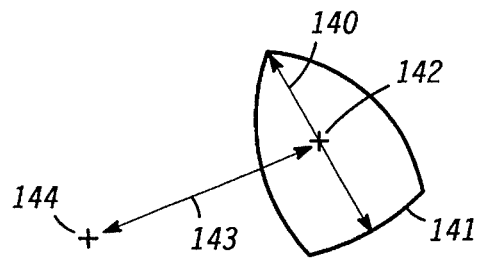
FIG. 7
FIG. 9
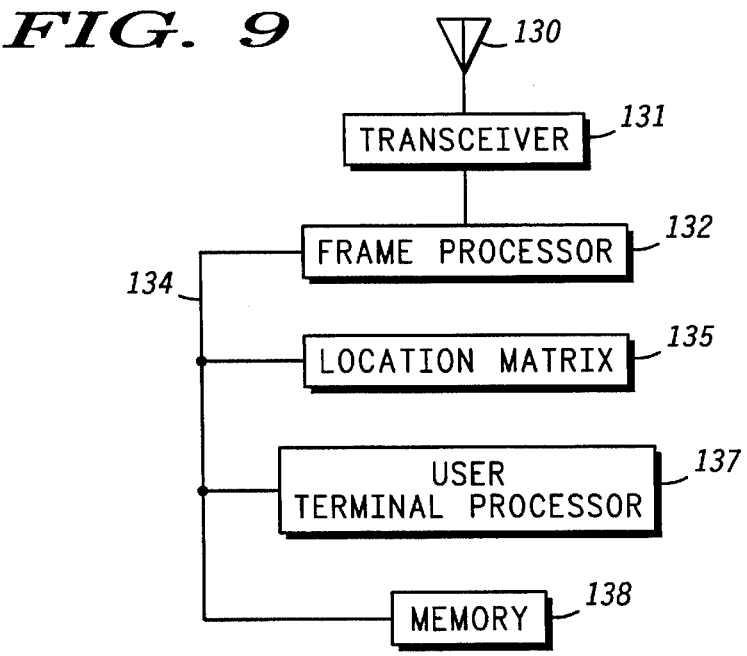
FIG. 10
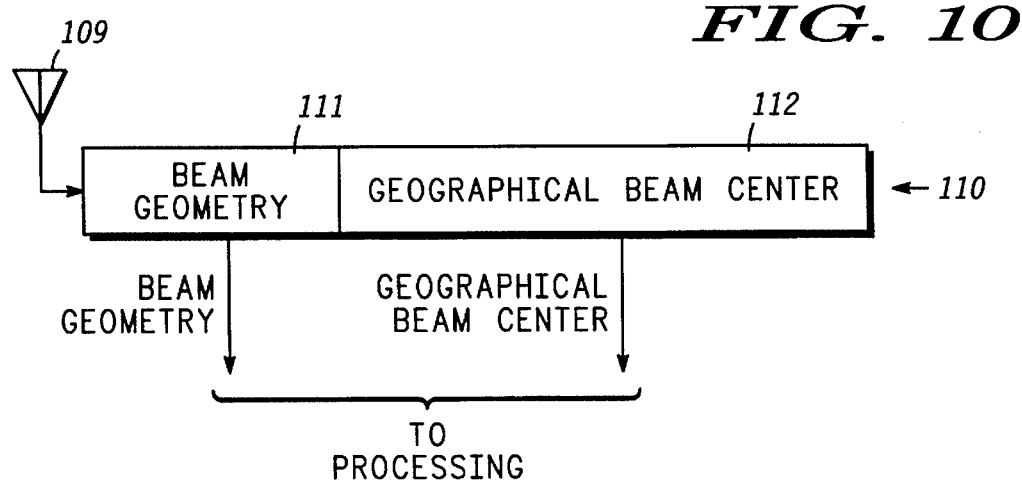

LOCATION DETERMINATION METHOD AND SYSTEM USING MULTI-BEAM SATELLITES

FIELD OF THE INVENTION

The present invention relates generally to satellite-based geolocation, and, more particularly, to a user terminal which uses multi-beam satellites to autonomously register its present location.

BACKGROUND OF THE INVENTION

Many diverse types of systems need to remotely determine the position of various objects or elements within them. For example, maritime, airborne, and land-bound entities use positioning information for navigational and other purposes. Communications systems, whether land-line telecommunication or cellular telecommunication, require location information to accurately route information from a data source to its destination. Accurate location information improves system safety, reliability, and efficiency. In the case of cellular telecommunications, accurate location information allows the system to efficiently route data to user terminals.

Cellular telecommunications systems use location information to route data to specific zones or cells of a system where a specific user terminal is known to exist. This partitioning of the system allows data delivery to specific cells within a system and does not require unnecessary consumption of system bandwidth in cells where the user terminal is not resident.

Positioning systems exist that utilize multiple satellites. Many of these, such as U.S. Pat. No. 4,445,118 to Taylor et al., utilize triangulation techniques but suffer limitations in that they require multiple satellites for position calculations. In other positioning systems, such as U.S. Pat. No. 4,819,053 to Halavais, a satellite with a scanning narrow beamwidth antenna looks for detectable transmissions from user terminals, but such systems place a considerable power burden on the transmitting user terminal.

The above-described prior art configurations could provide satisfactory positioning under some but not all, circumstances. In a global satellite communication system, known solutions would generally fail to deliver adequate geolocation at a reasonable price.

Thus, there is a significant need for an improved self-geolocation system for user terminals operating within a satellite cellular communication system.

SUMMARY OF THE INVENTION

The limitations cited above and others are substantially overcome through provisions of the self-geolocation method, the auto-registration method, and the system disclosed herein.

A method for determining location of user terminals in a multi-beam satellite communications system includes a satellite which projects multiple uniquely identified beams upon the earth and a terrestrial receiver or user terminal for identification of each unique passing beam. The user terminal discerns which beam is its servicing beam by determining the source of the greatest radiated power directed at it.

The user terminal receives the satellite's transmitted beam information and processes it to derive beam geometry information and, in conjunction with any existing stored information, to estimate the terminal's geolocation.

The method also includes comparing the newly calculated location of the user terminal with the location currently known to the routing base station. If the user terminal has sufficiently roamed, the user terminal then transmits its new location back to the satellite which forwards it to the base station for use in communications routing. The user terminal stores the transmitted location internally for future reference.

Thus, in one embodiment of the present invention there is provided a method for self-geolocation of user terminals using a single multi-beam satellite.

In another embodiment of the present invention a user terminal's present location is re-registered when the user terminal has sufficiently roamed from its previously known location.

According to one aspect of the invention, there is provided a method of determining a user terminal location, comprising the steps of receiving, at the user terminal, a satellite signal comprising servicing beam information, the servicing beam information being unique to a servicing beam of a multi-beam satellite; processing, at the user terminal, a beam geometry and a geographical beam center as derived from the servicing beam information, the beam geometry describing a representation of the shape of the servicing beam, and the geographical beam center defining a geographical coordinate within the servicing beam; and calculating, at the user terminal, a user terminal region wherein the user terminal is located.

According to another aspect of the invention, there is provided a user terminal for use in a satellite-based communications system wherein at least one satellite transmits a servicing beam comprising servicing beam information, the servicing beam information comprising beam geometry for describing the shape of the servicing beam and a geographical beam center for describing a geographical coordinate within the servicing beam, the terminal comprising means for receiving the servicing beam; means for processing the servicing beam to derive the beam geometry and the geographical beam center; and means for calculating a user terminal region wherein the terminal is located, using the beam geometry and the geographical beam center.

In contrast to known positioning systems, a positioning system constructed in accordance with the present invention enables a user terminal to self-determine its geolocation using a single multi-beamed satellite.

Thus, it is an advantage of the present invention to provide a positioning system which does not require multiple satellites.

Further, in contrast to known positioning systems, a positioning system constructed in accordance with the present invention does not require the user terminal to transmit to the satellite constellation in order to determine the terminal's geolocation, thus resulting in significant conservation of user terminal power.

Therefore, it is a further advantage of the present invention to provide a positioning system which conserves power in the user terminal.

The above features and advantages of the present invention will be better understood from the following detailed description taken in conjunction with the accompanying drawings.

BRIEF DESCRIPTION OF THE DRAWINGS

FIG. 7 is an illustration of distance calculations in a user terminal's location matrix, in accordance with an embodiment of the present invention.

FIG. 9 is a block diagram of a user terminal, in accordance with an alternative embodiment of the present invention.

FIG. 10 is an illustration of beam information, in accordance with an alternative embodiment of the present invention.

DESCRIPTION OF THE PREFERRED EMBODIMENT

Figure 1:
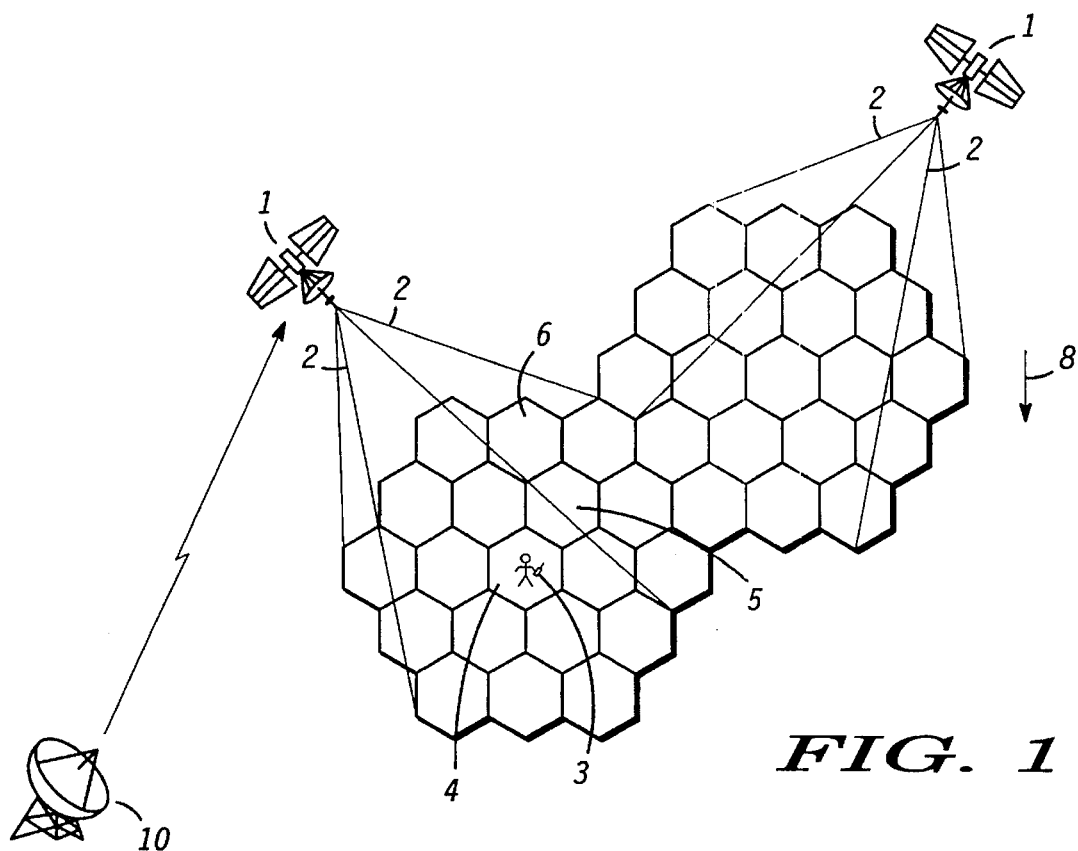
FIG. 1 depicts satellites projecting cellular patterns onto the earth, in accordance with an embodiment of the present invention.

FIG. 1 depicts satellites projecting cellular patterns onto the earth, in accordance with an embodiment of the present invention. As shown, the communication system comprises base station 10, multi-beam satellite 1 having antenna system 2 and a subscriber with user terminal 3. Information destined for a subscriber with user terminal 3 is assembled at base station 10 with routing instructions. This packaged information is transmitted up to multi-beam satellite 1. The satellite determines from the routing instructions which of its multi-beams is the current servicing beam 4 which is projected onto user terminal 3. Satellite 1 then transmits the packet of information to user terminal 3.

The satellite constellation is in continuous orbit. As such, servicing beam 4 of satellite 1 tracks the ground in the direction of the satellite orbit 8. Eventually, servicing beam 4 will track past user terminal 3. Satellite 1 will then redirect the information packets destined for user terminal 3 to a new servicing beam 5. As the process continues, the information packets will eventually be redirected to servicing beam 6.

Figure 2:
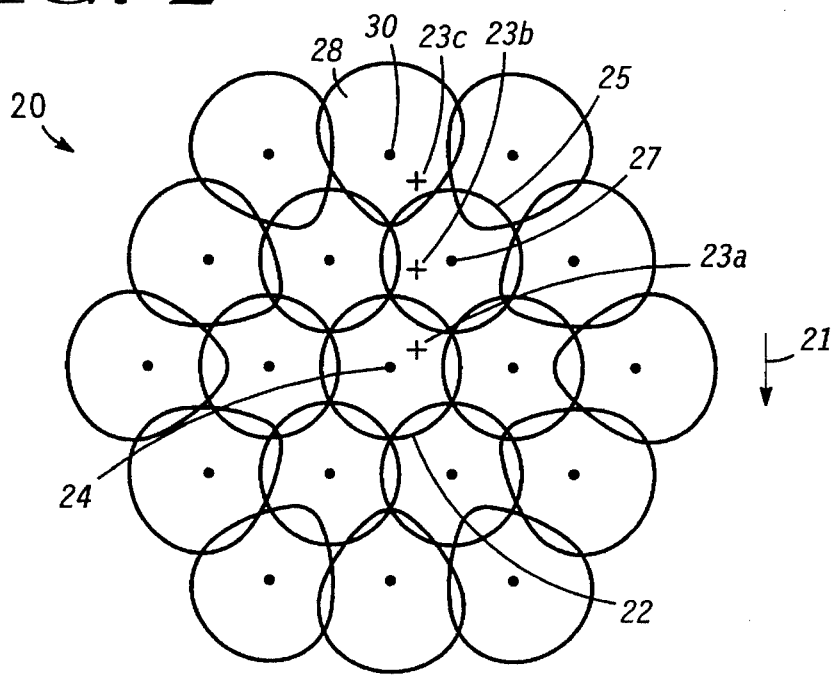
FIG. 2 depicts a satellite antenna's multi-beam projections as projected upon and about the location of several user terminals, in accordance with an embodiment of the present invention.

FIG. 2 depicts a satellite antenna's multi-beam projections as projected upon and about the location of several user terminals, in accordance with an embodiment of the present invention. This figure shows a more detailed view of a multi-beam projection pattern 20. The centrally located beams 22 appear nearly circular because they are projected relatively straight below the satellite 1, while the peripheral beams 28 appear elongated because of their outward projection from the satellite's ground track.

Along with information destined for the subscriber having user terminal 3, the satellite also transmits servicing beam information. Servicing beam information provides the user terminal with descriptive identification information regarding various characteristics of the servicing beam. These characteristics may include the servicing beam shape, the center of the projected beam, orientation, and/or an identification number.

Geographical beam centers 24, 27, and 30 are shown located centrally within their respective beams. These beam centers may be defined as longitude/latitude coordinates or system-defined coverage zones. The satellite updates the geographical beam centers as it advances in orbit.

A user terminal 23 is depicted in FIG. 2 as having three separate locations, 23a, 23b, and 23c. Each separate instance of the location of a user terminal 23 is separated by a sampling time period. The figure gives the appearance that user terminal 23 is moving, when in fact, the significant movement is caused by the orbiting of the satellite and the progression of a multi-beam projection pattern 20 in direction 21.

The location of user terminal 23 is shown within servicing beam 22 as user terminal 23a. Servicing beam 22 has geographical beam center 24. As the satellite orbits in direction 21, servicing beam 22 advances past user terminal 23a. Beam 25 approaches user terminal 23 and becomes the servicing beam for user terminal 23b. The location of user terminal 23b then lies within servicing beam 25. Subsequently, as the satellite continues in its orbit, beam 25 advances past user terminal 23, and beam 28 approaches. Beam 28 then services user terminal 23. The location of user terminal 23c then lies within servicing beam 28.

In the present invention, the user terminal determines its current location by analyzing servicing beam information. The user terminal then compares its presently calculated position with its position as known by base station 10. If the distance differential exceeds a predetermined roaming threshold, user terminal 3 relays its new position (i.e. registration) to base station 10. Base station 10 must have current location information on each user terminal in the system to accommodate efficient routing through satellite 1 and through servicing beams. The base station maintains a directory of user terminal locations.

Figure 3:
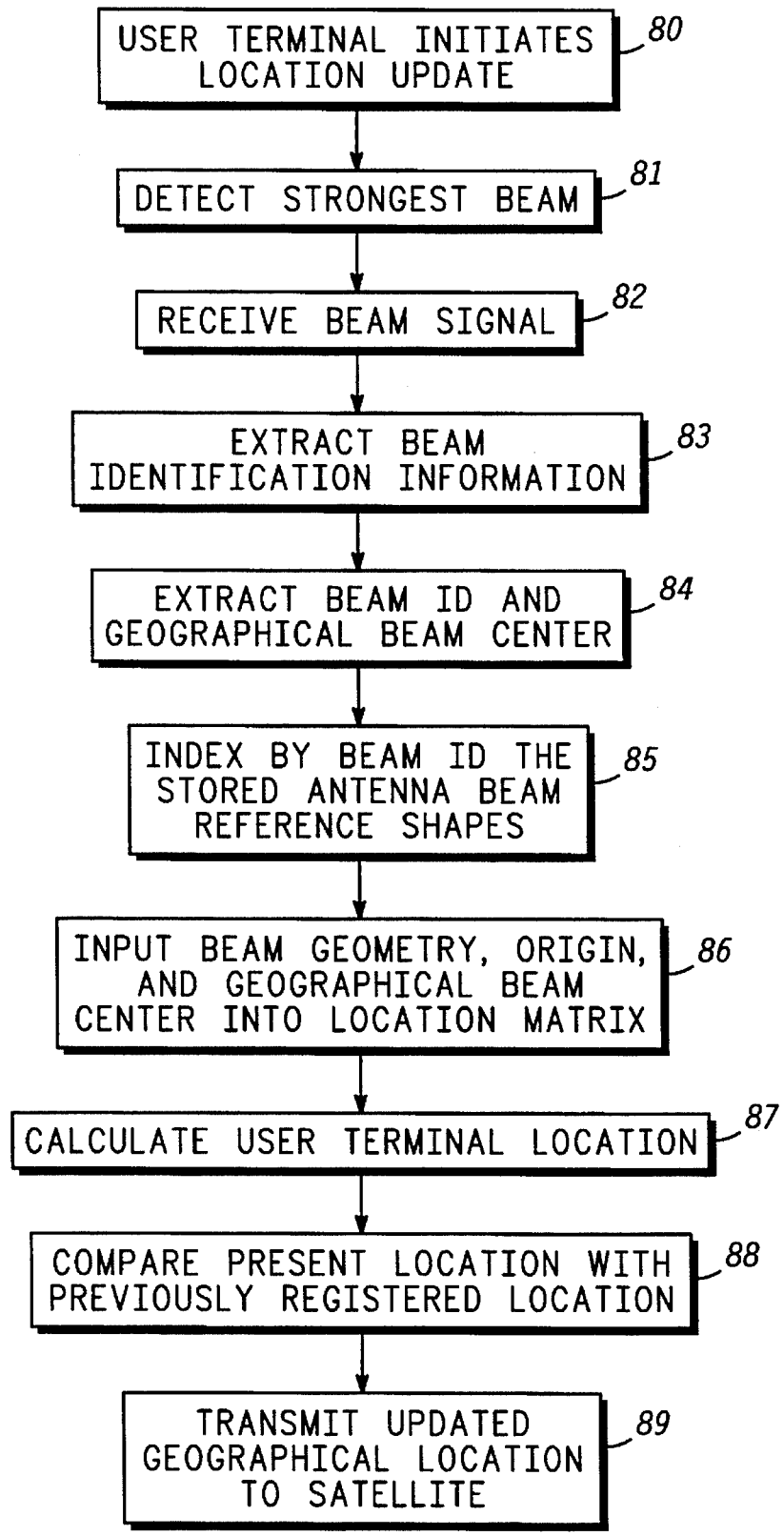
FIG. 3 is a flow chart showing the user terminal location calculation and re-registration process, in accordance with a preferred embodiment of the present invention.

FIG. 3 is a flow chart showing the user terminal location calculation and re-registration process, in accordance with a preferred embodiment of the present invention. FIG. 3 shows various servicing beam procedures performed within user terminal 3 to determine its current location. In a preferred embodiment, the user terminal initiates task 80 by acquiring a location sample. This task 80 may be initiated on a periodic or aperiodic basis.

The user terminal may implement very simple or more complex monitoring to determine when to process additional samples. These techniques may involve receiving a beam signal and determining if a desired level of diversity exists between the new sample and previous samples. In one embodiment, the user terminal waits a pre-determined length of time before processing additional samples. Other embodiments include: (i) extracting and comparing a newly received beam ID against a previously stored beam ID to verify that new beam characteristics are available, and (ii) monitoring and comparing power levels to determine when new beams are approaching or receding.

User terminal 3 next performs task 81 to determine the strongest beam. An analysis of beam power levels typically identifies the servicing beam that is projected about the user terminal, barring any shadowing of the user terminal by physical objects. Task 82 begins receiving the beam signal, which includes both user terminal information and beam identification information.

A task 83 separates the beam identification information from the general signal information. This beam identification information is separated because it is consumed by the user terminal in calculating user terminal location.

A task 84 further processes the beam identification information by extracting the characteristics of the servicing beam. In a preferred embodiment, these characteristics are beam ID and geographical beam center. The beam ID is a unique identifier of each beam of multi-beam projection pattern 20. The geographical beam center is a coordinate-defined point or region about which the servicing beam is projected. Satellite 1 keeps this information current as its multi-beam projection pattern advances across the earth.

A task 85 indexes a stored antenna beam geometry library 44 using the beam ID. This library contains a suite of projection patterns representative of the actual projected beams from satellite antenna system 2. The representative beams are cataloged by beam IDs and also have an origin defining a reference point associated with the beam geometry. The stored beam geometry and origin are retrieved for processing.

Task 86 processes the beam geometry and its origin by placing them into location matrix 60. The geographical beam center, as extracted in task 84, is also entered into location matrix 60. If the beam geometry is the first sample sent to the location matrix, then the location matrix aligns the beam geometry at the origin of the location matrix. If the entered beam geometry is a subsequent sample, then the current geographical beam center is compared with any previously processed geographical beam center data. This comparison yields an offset. This offset is representative of the geographical spacing between the servicing beams had they simultaneously been the servicing beam at the time the beam signals were sampled. This offset is then utilized to provide a representative offset in the location matrix. The stored beam geometry is then actually offset in the location matrix by positioning the stored beam geometry's origin according to the offset and then placing the beam geometry around the origin as defined in the stored beam geometry library.

Task 87 calculates the region or location of the user terminal. An individual beam geometry, by definition, forms a servicing region or boundary wherein the user terminal should be located. As beam projection geometries are overlaid and accumulate in the location matrix, a common or overlapping area becomes defined. This common area is computed and becomes increasingly smaller as additional samples are processed. This common region defines a location having an increased probability of user terminal presence.

Additional processing may be performed on this region, such as estimating major axis 140 (FIG. 7) and determining a midpoint 142 located on major axis 140. An intersecting minor axis or a centroid of the common area may also be calculated.

A task 88 compares the current calculated user terminal location with the stored value of the most recently updated location transmitted to satellite 1 for delivery to base station 10. The user terminal has a roaming threshold defining the distance that the user terminal may roam before it is required to re-register its current location with base station 10.

A task 89 performs a re-registration (i.e., updating the user terminal's location as known by the base station). This re-registration process is only carried out if the user terminal has sufficiently roamed from its previously registered location. The user terminal assembles a location updating message and transmits it to base station 10 via satellite 1. The newly re-registered location is stored in the user terminal for future comparison.

Figure 4:
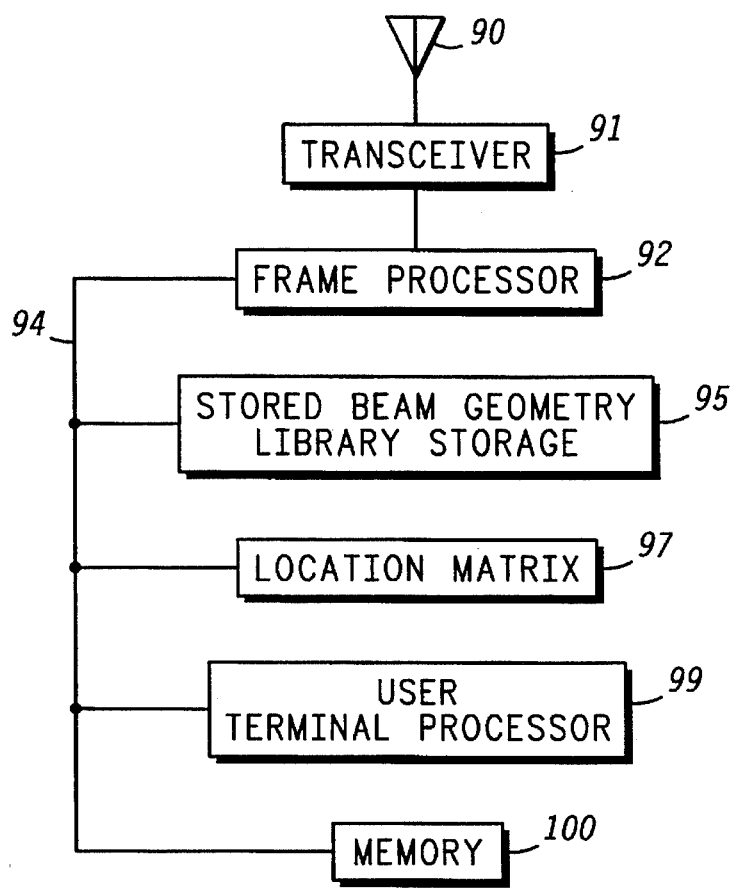
FIG. 4 is a block diagram of a user terminal capable of receiving and processing information signals from a satellite and further capable of transmitting signals back to the satellite, in accordance with a preferred embodiment of the present invention.

FIG. 4 is a block diagram of a user terminal capable of receiving and processing information signals from a satellite and further capable of transmitting signals back to the satellite, in accordance with a preferred embodiment of the present invention. User terminal 3 has antenna 90 and transceiver 91. A frame processor 92 extracts beam identification information from the received beam signal and builds the frame formats for transmission of updated location data to the satellite.

User terminal processor 99 further processes the extracted beam identification information and controls the supporting elements such as stored beam geometry library storage 95 and location matrix 97. Memory 100 provides storage for roaming threshold values, geographical beam centers, and beam IDs of earlier received samples.

Library storage 95 is a memory element or part of existing support memory containing the stored representations of the satellite beam projections. Location matrix 97 is also a memory device or part thereof for receiving and accumulating beam geometry information.

Figure 5:
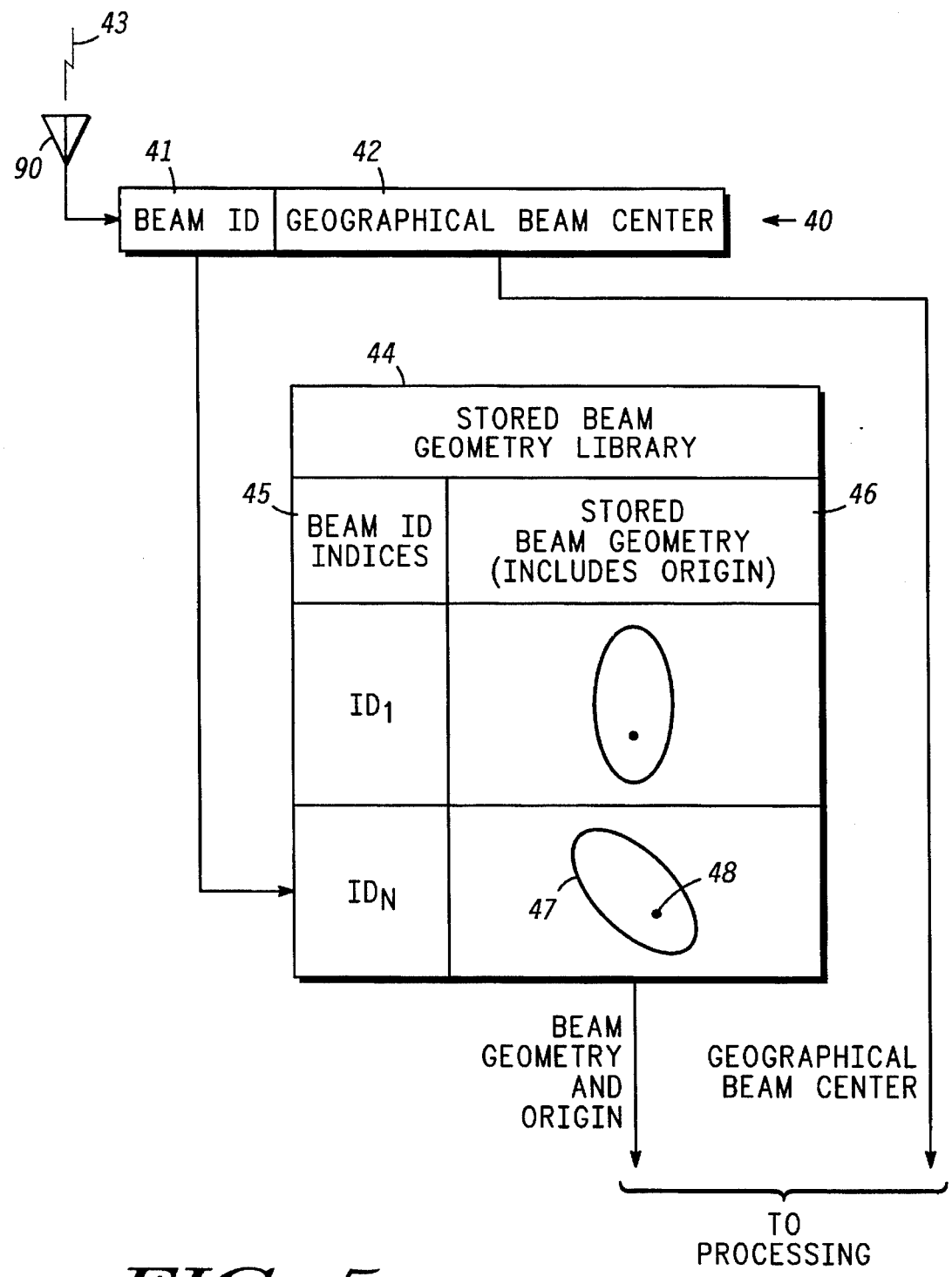
FIG. 5 is an illustration of a satellite beam's transmitted identification and location information and the use of this information in indexing a user terminal's stored beam geometry library, in accordance with a preferred embodiment of the present invention.

FIG. 5 is an illustration of a satellite beam's transmitted identification and location information and the use of this information in indexing a user terminal's stored beam geometry library, in accordance with a preferred embodiment of the present invention. Satellite signal 43 is received by antenna 90 of the user terminal. Frame processor 92 (FIG. 4) processes the satellite signal 43 to derive servicing beam information 40. Servicing beam information 40 comprises, among other things, beam ID 41 and geographical beam center 42.

Beam ID 41 uniquely identifies each satellite beam as projected from the satellite's antenna system 2 (FIG. 1). A stored representation of the geometry of each beam is stored in user terminal 3. It should be noted that a representative subset of the satellite beam projections could suffice for common beam shapes. This stored representation is located in stored beam geometry library 44. Stored beam geometry library 44 contains indices 45 corresponding to stored beam geometry 46. These indices, when referenced, locate a corresponding stored beam geometry 46.

A beam ID=N corresponds to stored beam geometry 47 with origin 48. Stored beam geometry 47 and origin 48 are output in a preferred embodiment as the beam geometry input and origin to location matrix 97 (FIG. 4) for processing. Geographical beam center 42 is also sent to location matrix 97 for generation of offsets for use in positioning and overlaying future samples of beam geometries.

Figure 6:
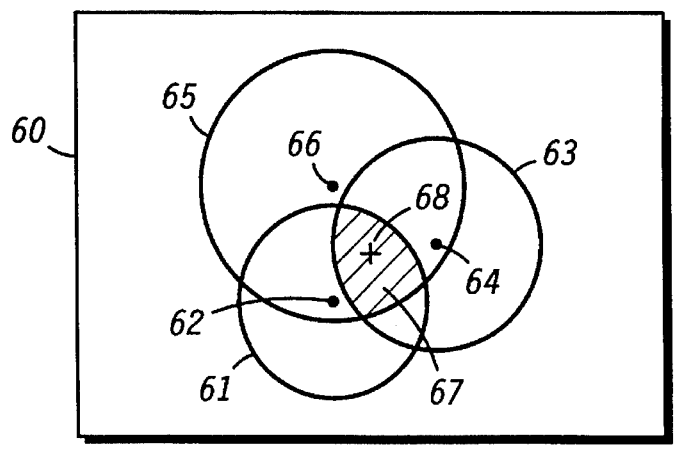
FIG. 6 is an illustration of the overlay of multiple reference cell beams in a user terminal's location matrix, in accordance with an embodiment of the present invention.

FIG. 6 is an illustration of the overlay of multiple reference cell beams in a user terminal's location matrix, in accordance with an embodiment of the present invention. FIG. 6 provides an example of a location matrix 60 having multiple samples of beam geometries therein. A first received and processed satellite signal yields beam geometry 61 with origin 62. Beam geometry 61 with origin 62 are input to location matrix 60.

A subsequent second received and processed satellite signal is processed and yields beam geometry 63 with origin 64. Geographical beam center 42 (FIG. 5) or 112 (FIG. 10) of the second received signal is used to calculate an offset for the displacement of second beam geometry 63 in location matrix 60. The second beam geometry 63 is entered into location matrix 60 with origin 64 located at the calculated offset. Second beam geometry 63 then overlays first beam geometry 61.

Additional satellite signals may be received and processed. FIG. 6 further shows a third received and processed satellite signal yielding yet another beam geometry 65 with origin 66. A new offset is calculated from the third received geographical beam center. Origin 66 is placed at this offset with beam geometry 65 placed thereabout.

As shown, the continued sampling and placement of subsequent beam geometries yields a common area defining user terminal region 67. Actual user terminal location 68 is superimposed on FIG. 6 to illustrate the actual location of the user terminal throughout the multiple sample processing of satellite signals.

FIG. 7 is an illustration of distance calculations in a user terminal's location matrix, in accordance with an embodiment of the present invention. FIG. 7 illustrates further processing of a representative user terminal region 141 similar to that shown as user terminal region 67 in FIG. 6. User terminal region 141 defined by the intersection of multiple samples yields an irregular area. Major axis 140 and midpoint 142 are calculated. Major axis 140 defines a maximum range error of a user terminal within user terminal region 141. If range error exceeds a range error threshold value, a user terminal may process additional samples to reduce major axis 140 below threshold value. Midpoint 142, for calculation purposes, serves as the current calculated user terminal location. Those skilled in the art would realize that calculated user terminal location 142 may be positioned anywhere in user terminal region 141 by using other calculation methods such as weighting certain beam geometries, or calculating an intersecting minor axis.

The current calculated user terminal location 142 is compared against previously registered user terminal location 144 known by base station 10 to determine the roamed distance 143. If the roamed distance 143 exceeds the roaming threshold, then user terminal 3 re-registers with base station 10 to provide efficient network routing of information.

Figure 8:
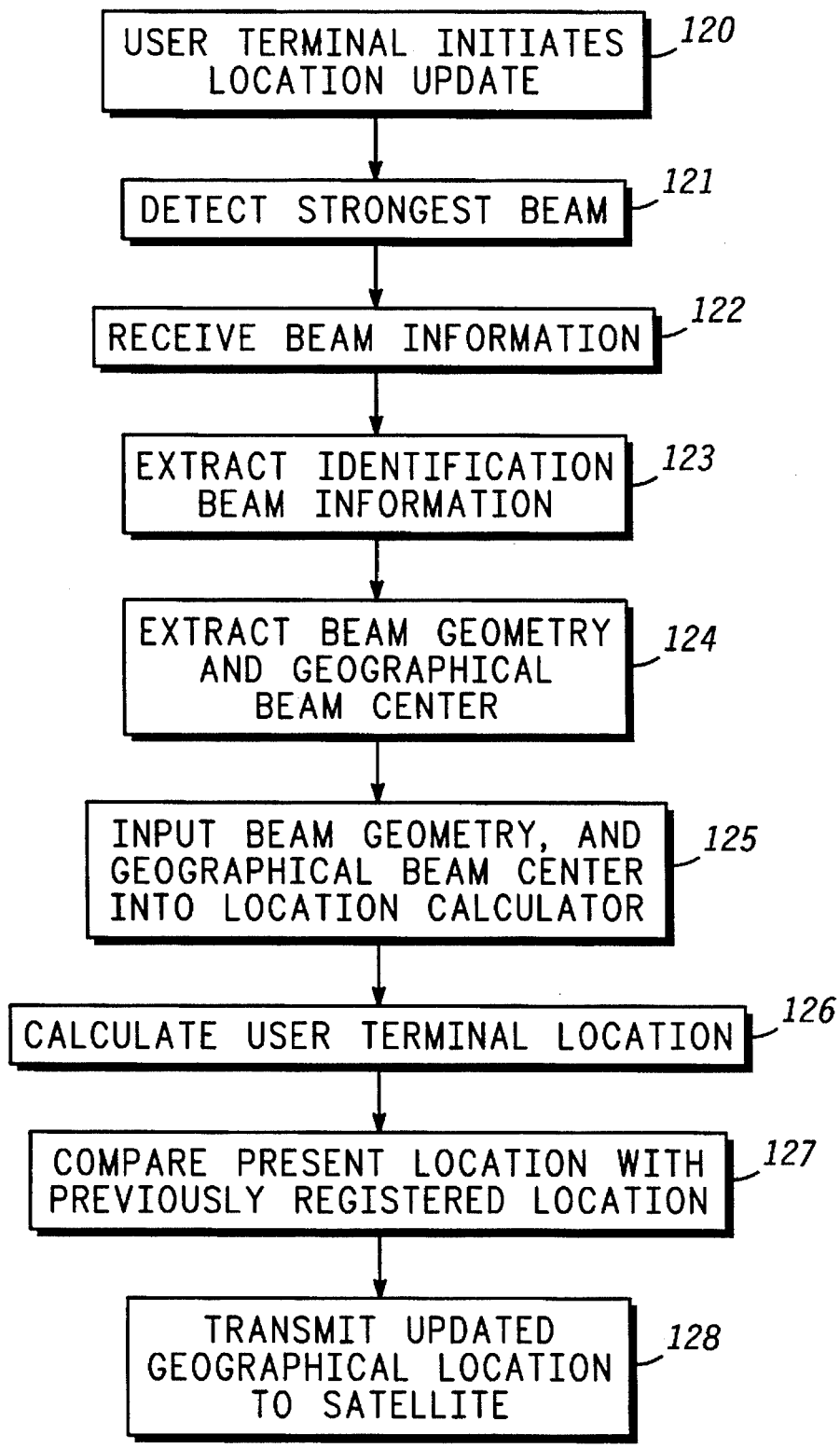
FIG. 8 is a flowchart showing a user terminal's location calculation and re-registration process, in accordance with an alternative embodiment of the present invention.

FIG. 8 is a flowchart showing a user terminal's location calculation and re-registration process, in accordance with an alternative embodiment of the present invention. FIG. 8 shows various servicing beam procedures performed within user terminal 3. Tasks 120–123 perform the same functions as tasks 80–83 of FIG. 3, respectively.

A task 124 further processes the beam identification information by extracting the characteristics of the servicing beam. In this alternate embodiment, these characteristics are beam geometry 111 and geographical beam center 112. Beam geometry 111 is a geometric description of the beam shape of the servicing beam. In this embodiment, the satellite transmits the beam geometry, in contrast to the previously described embodiment where the satellite transmits a beam ID used for indexing the stored beam geometry library within user terminal 3. Geographical beam center 112 is a coordinate-defined point or region about which the servicing beam is projected. Satellite 1 keeps this information current as its multi-beam projection pattern advances across the earth.

A task 125 enters the beam geometry 111 and geographical beam center 112 into location matrix 60. Location matrix 60 compares the current geographical beam center with any previously processed geographical beam center data. This comparison yields an offset. This offset is representative of the geographical spacing between the servicing beams had they simultaneously been the servicing beam. This offset is then utilized to provide a representative offset in the location matrix. The beam geometry is then actually offset in location matrix 60 by positioning beam geometry 111 according to the offset calculated from current geographical beam center 112 and a previous value.

Tasks 126–128 of the alternate embodiment correspond to tasks 87–89 of the previously described embodiment. Task 126 calculates the region or location of user terminal 3. An individual beam geometry, by definition, forms a servicing region or boundary wherein the user terminal should be located. As beam geometries are overlaid and accumulate in the location matrix, a common or overlapping area becomes defined. This common area becomes increasingly smaller as additional samples are processed. This region defines a location having an increased probability of user terminal presence.

Additional processing may be performed, as discussed earlier, on this region such as centering the determined location according to the major axis or calculating a centroid of area associated with the area of intersection.

A task 127 compares the current calculated user terminal location with the stored value of the most recently updated location transmitted to satellite 1 for delivery to base station 10. User terminal 3 has a roaming threshold defining the distance that user terminal 3 may roam before it is required to re-register its current location with the base station 10.

A task 128 performs a re-registration (i.e., updating the user terminal's location as known by the base station). This registration process is only carried out if the user terminal has sufficiently roamed from its previously registered location. The user terminal assembles a location updating message for delivery to base station 10 via satellite 1.

FIG. 9 is a block diagram of a user terminal, in accordance with an alternative embodiment of the present invention. A user terminal has an antenna 130 and transceiver 131. Frame processor 132 extracts beam identification information from the received beam signal and builds the frame formats for transmission of updated location data to the satellite. User terminal processor 137 further processes the extracted beam identification information and controls the supporting elements such as location matrix 135. Memory 138 provides storage for roaming threshold values, and geographical beam centers of earlier received samples.

FIG. 10 is an illustration of beam information, in accordance with an alternative embodiment of the present invention. FIG. 10 illustrates the information content of servicing beam information 110. A satellite signal is received by antenna 109 of the user terminal and comprises servicing beam information 110. Servicing beam information 110 comprises beam geometry 111 and geographical beam center 112. Beam geometry 111 is an approximation of the beam's geometry. Geographical beam center 112 is also sent to location matrix 135 (FIG. 9) for generation of offsets for use in positioning and overlaying future samples of beam geometries.

These and other changes and modifications which are obvious to those skilled in the art are intended to be included within the scope of the present invention.

Thus there has been described herein a concept, as well as several embodiments including a preferred embodiment, of a positioning system and method in which a user terminal performs self geolocation and may determine when re-registration is necessary for efficient network routing of information to a user terminal.

Because the various embodiments of the positioning system and method as herein-described do not required more than one satellite, they perform with a significant improvement in efficiency.

Additionally, since all geolocation functions are passive with respect to the satellite, and the user terminal autonomously determines when re-registration is necessary, system bandwidth and satellite interaction are conserved and minimized.

Furthermore, it will be apparent to those skilled in the art that the disclosed invention may be modified in numerous ways and may assume many embodiments other than the preferred form specifically set out and described above.

What is claimed is:

1. A method of determining a user terminal location, comprising the steps of:
   (a) receiving, at said user terminal, a satellite signal comprising servicing beam information, said servicing beam information being unique to a servicing beam of a multi-beam satellite;
   (b) processing, at said user terminal, a beam geometry and a geographical beam center as derived from said servicing beam information, said beam geometry describing a representation of the shape of said servicing beam, and said geographical beam center defining a geographical coordinate within said servicing beam; and
   (c) calculating, at said user terminal, a user terminal region wherein said user terminal is located, said user terminal region defined by said beam geometry and said geographical beam center.

2. A method of determining when a user terminal should transmit its present location to a base station, comprising the steps of:
   (a) receiving, at said user terminal, a satellite signal comprising servicing beam information, said servicing beam information being unique to a servicing beam of a multi-beam satellite;
   (b) processing, at said user terminal, a beam geometry and a geographical beam center as derived from said servicing beam information, said beam geometry describing a representation of the shape of said servicing beam, and said geographical beam center defining a geographical coordinate within said servicing beam;
   (c) calculating, at said user terminal, a user terminal region wherein said user terminal is located, said user terminal region defined by said beam geometry and said geographical beam center,
   (d) comparing said user terminal region with a stored value of a last reported user terminal region;
   (e) transmitting said user terminal region if the distance between said user terminal region and said last reported user terminal region exceeds a predetermined roaming threshold; and
   (f) storing said user terminal region as a new value of said last reported user terminal region if said user terminal region was transmitted.

3. A method as claimed in claim 2, wherein step (a) further comprises the sub-steps of:
   (a1) extracting a beam ID from said servicing beam information, said beam ID being a unique index for said servicing beam of said multi-beam satellite;
   (a2) indexing, at said user terminal, a stored beam geometry library using said beam ID as an index to stored beam geometry, said stored beam geometry from said stored beam geometry library being an approximation of actual geometry of said servicing beam;
   (a3) retrieving, at said user terminal, said stored beam geometry from said stored beam geometry library; and
   (a4) extracting said geographical beam center from said servicing beam information.

4. A method as claimed in claim 2, wherein step (a) further comprises the sub-steps of:
   (a1) extracting said beam geometry from said servicing beam information, said beam geometry being an approximation of actual geometry of said servicing beam; and
   (a2) extracting said geographical beam center from said servicing beam information.

5. A method as claimed in claim 2, wherein step (b) further comprises the sub-steps of:
   (b1) entering said beam geometry and said geographical beam center into a location matrix; and
   (b2) aligning said beam geometry using the origin of said location matrix with said geographical beam center.

6. A method as claimed in claim 2, wherein step (b) further comprises the sub-steps of:
   (b1) entering said beam geometry and said geographical beam center into a location matrix;
   (b2) offsetting said beam geometry using the origin of said location matrix with said geographical beam center; and
   (b3) overlaying existing beam geometries with said beam geometry.

7. A method as claimed in claim 2, wherein
   said user terminal region of said calculating step is a common area of a plurality of stored samples of said beam geometries.

8. A method as claimed in claim 7, wherein said calculating step further comprises:
   estimating a major axis of said user terminal region; and
   determining a calculated position of said user terminal, said calculated position being a midpoint on said major axis.

9. A method of determining when a user terminal should process location information transmitted by a multi-beam satellite system, comprising the steps of:
   (a) receiving, at said user terminal, a satellite signal comprising servicing beam information, said servicing beam information being unique to a servicing beam of a multi-beam satellite;
   (b) determining whether said servicing beam information provides diversity between said servicing beam information and previously received servicing beam information;
   (c) processing in response to determination of said diversity at said user terminal, a beam geometry and a geographical beam center as derived from said servicing beam information, said beam geometry describing a representation of the shape of said servicing beam, and said geographical beam center being a geographical coordinate within said servicing beam; and
   (d) calculating in response to determination of said diversity at said user terminal, a user terminal region wherein said user terminal is located.

10. A method as claimed in claim 9, wherein step (b) further comprises the sub-steps of:

(b1) extracting a beam ID from said servicing beam information, said beam ID being a unique index for said servicing beam of said multi-beam satellite; and (b2) comparing said beam ID with a previously processed beam ID for determining said diversity.

11. A method as claimed in claim 9, wherein step (b) further comprises the sub-steps of:

(b1) monitoring the received power level of said servicing beam; and (b2) comparing said received power level with a previously received power level for determining said diversity.

12. A method as claimed in claim 9, wherein step (b) further comprises the sub-step of waiting a fixed period of time to provide said diversity.

13. A telecommunication system for transmitting voice and data communications for delivering information to known subscribers by accurately knowing their present locations, said system comprising:

a constellation of multi-beam satellites, said satellites transmitting servicing beam information, said servicing beam information providing location information defined by a beam geometry and a geographical beam center;

a population of user terminals being capable of receiving and processing said servicing beam information; and a base station for maintaining a directory of said user terminals' most current location.

14. A system as claimed in claim 13 wherein each of said user terminals comprise:

a transceiver;

a frame processor;

a memory, said memory storing a last-reported user terminal region, said user terminal region defined by said beam geometry and said geographical beam center; and a terminal processor coupled to said memory, said frame processor, and said transceiver.

15. A system as claimed in claim 14 wherein each of said user terminals further comprise storage for a stored beam geometry library.

16. A system as claimed in claim 14 wherein each of said user terminals further comprise memory for use as a location matrix, said location matrix storing said beam geometries.

17. A user terminal for use in a satellite-based communications system wherein at least one satellite transmits a servicing beam comprising servicing beam information, said servicing beam information comprising beam geometry for describing the shape of said servicing beam and a geographical beam center for describing a geographical coordinate within said servicing beam, said terminal comprising:

means for receiving said servicing beam;

means for processing said servicing beam to derive said beam geometry and said geographical beam center; and means for calculating a user terminal region wherein said terminal is located, using said beam geometry and said geographical beam center.

18. The user terminal as recited in claim 17, and further comprising:

means for storing a previous user terminal region, said user terminal region defined by said beam geometry and said geographical beam center; and means for comparing said calculated user terminal region with said previous user terminal region, and for transmitting said calculated user terminal region if the difference between said calculated user terminal region and said previous user terminal region exceeds a predetermined value.

19. The user terminal as recited in claim 18, and further comprising:

means for storing said calculated user terminal region if said calculated user terminal region was transmitted, said user terminal region defined by said beam geometry and said geographical beam center.

* * * * *